Figure 1:
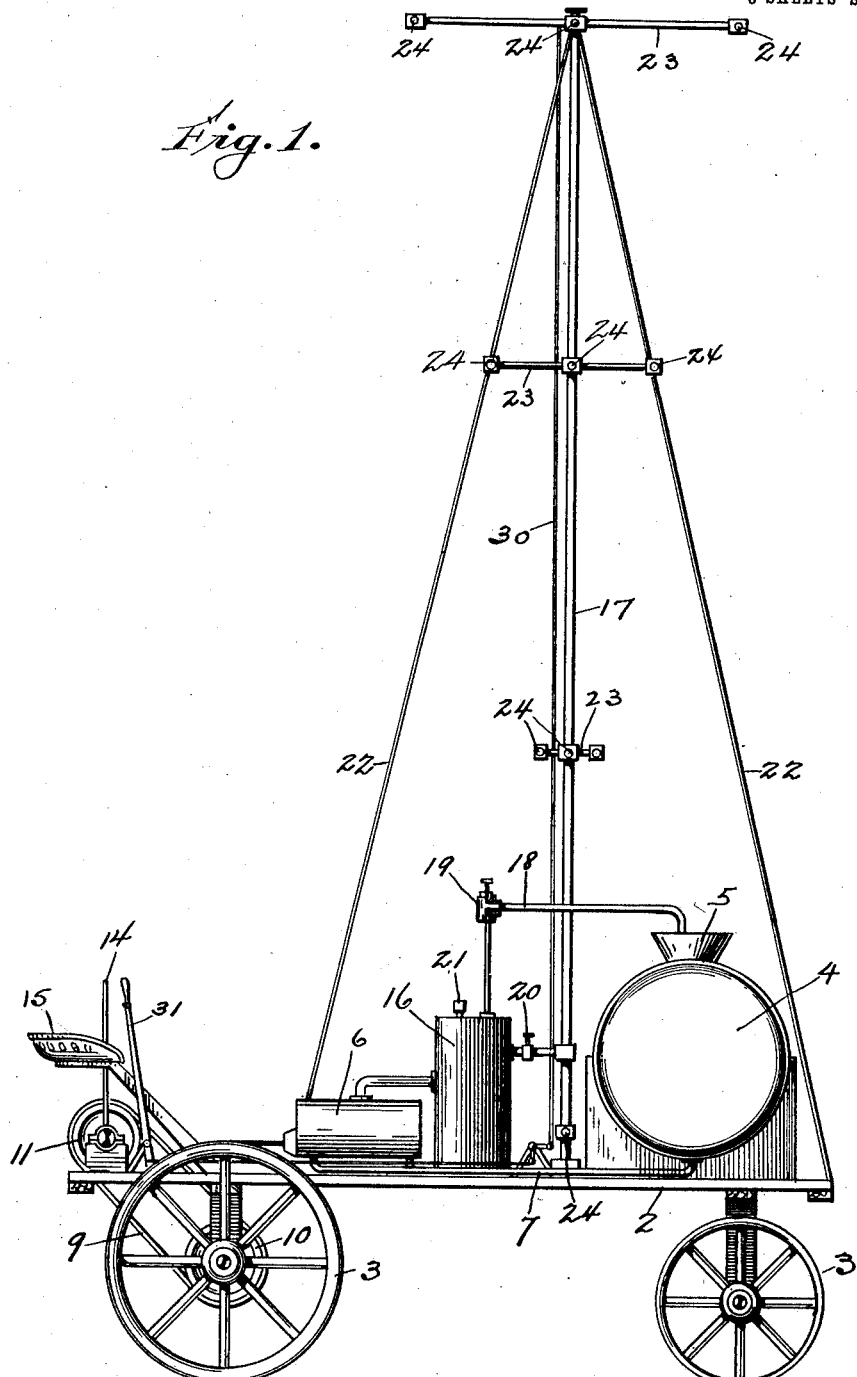

E. BATISTONI.
SPRAYING APPARATUS.
APPLICATION FILED MAR. 22, 1910.

997,034.

Patented July 4, 1911.

3 SHEETS—SHEET 2.

Witnesses:
Arthur L. Slee
H. J. Pratt

Inventor
EOLO BATISTONI
By S. E. Osborn
his atty.

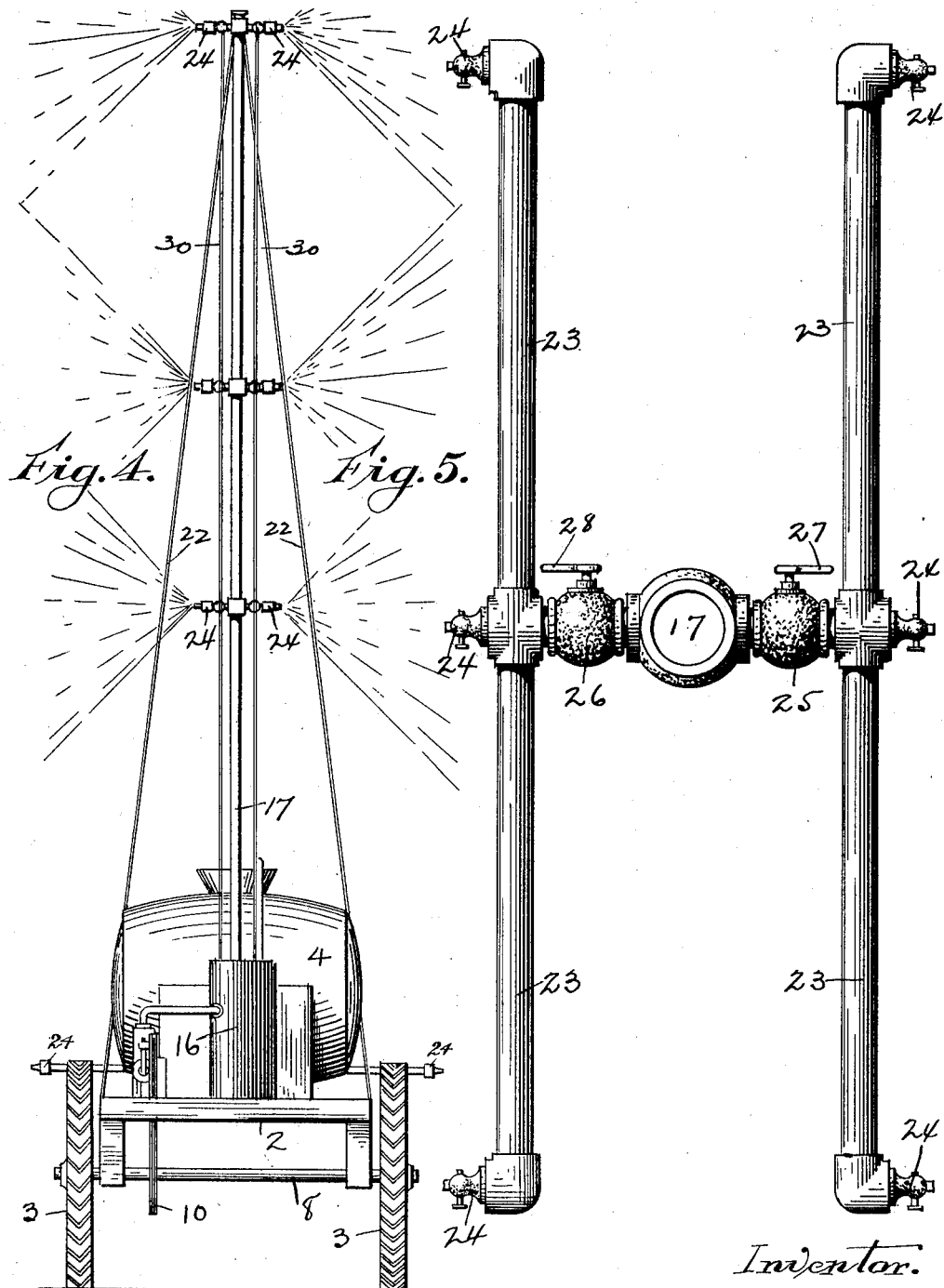

UNITED STATES PATENT OFFICE.

EOLO BATISTONI, OF SAN FRANCISCO, CALIFORNIA.

SPRAYING APPARATUS.

997,034. Specification of Letters Patent. Patented July 4, 1911.

Application filed March 22, 1910. Serial No. 550,906.

*To all whom it may concern:*

Be it known that I, EOLO BATISTONI, a subject of the King of Italy, and a resident of the city and county of San Francisco and State of California, have invented new and useful Improvements in Spraying Apparatus, of which the following is a specification.

The invention relates to improvements in spraying apparatus which are employed in orchards and vineyards for spraying the trees and vines with solutions adapted to preserve the trees against the attacks of insects and disease, and more particularly to a portable apparatus to be used for spraying hop vines.

The object of the invention is to provide an apparatus of this character of a simple, effective and inexpensive construction adapted to be drawn by horses and provided with means actuated by the movement of the apparatus for effecting the spraying.

Another object of the invention is the provision of a spraying apparatus which can be operated to spray the vines on one or both sides of the road or path between the rows.

A further object of the invention is to provide a spraying apparatus which is adapted to project a spray at all points of the tree or vine, and to project the spray over several rows of vines on either side of the road or path at the same time.

In the culture and raising of hops a series of rows are planted close together and a path or roadway is provided between adjacent groups of rows. During the growth of the plants they are arranged on frames or trellises, so that the area between the roadways are more or less covered with the vines. To properly treat all of the vines it is necessary to project the spray longitudinally at the vines along the edge, and to project it over and onto the vines in the center. The spray entering the cluster of vines longitudinally penetrates to the center of the cluster effectively treating the lower parts of the vines, and the spray from the upper nozzles is effective on the upper parts of the vines.

In spraying the vines along one edge of the field it is necessary to confine the spraying operation to one side of the road, and in the present device I have provided means operative by the driver of the vehicle for adjusting the sprays to meet the conditions. When a vineyard is attacked by disease the affected portions are generally isolated and the vineyard as a whole is not attacked. It is evident, therefore, that it is advisable to have some means to conveniently regulate the sprays, so that the spraying solution need be applied only to the infected spots and not to the whole vineyard.

To these objects the invention consists of a vehicle having the spraying appartus arranged thereon, and adapted to be operated by the motion of the vehicle and provided with means within reach of the driver for regulating the spray on either side independently.

The following description explains at length the nature of my said improvements and the manner in which I proceed to apply the same in the production of a spraying apparatus, reference being had to the drawings accompanying this specification.

Figure 2:
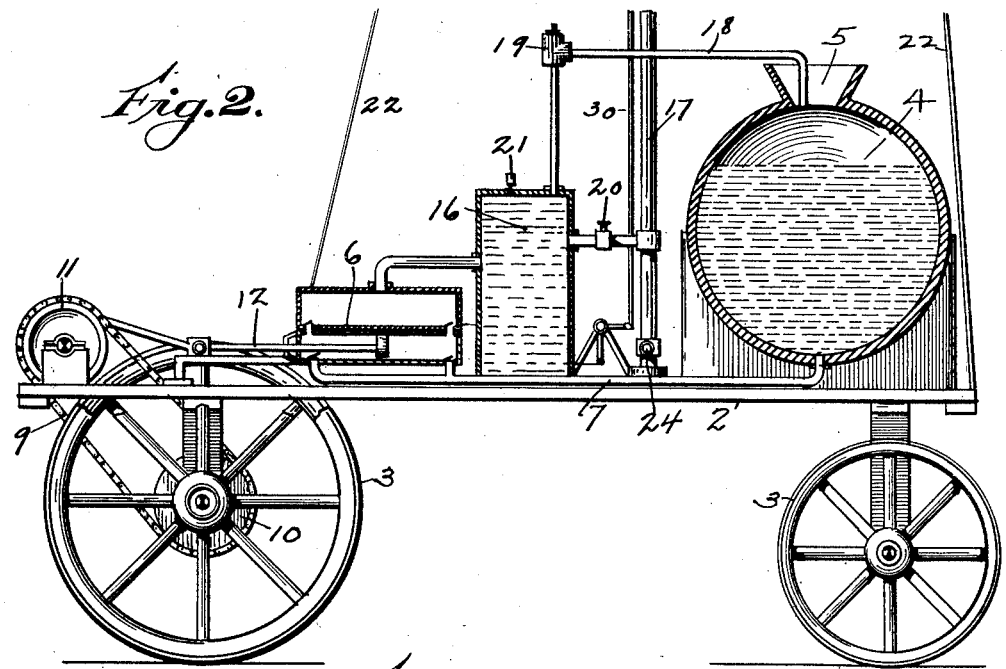
Figure 3:
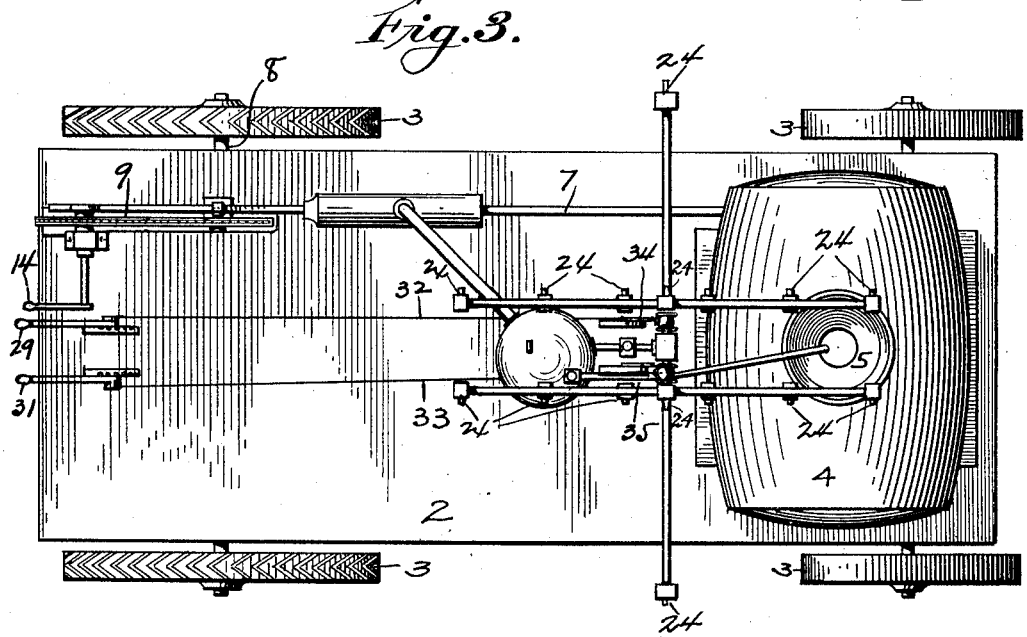

Figure 1 is a side elevation of the complete apparatus, the tongue and whiffle-tree being removed from the vehicle. Fig. 2 is a longitudinal section through the containing and pumping apparatus. Fig. 3 is a plan view showing the relative positions of the various parts. Fig. 4 is an end view. Fig. 5 is a detail plan view of one pair of the spraying arms.

In constructing a spraying apparatus in accordance with my invention, the vehicle frame 2 of suitable form and strength to support the several parts is mounted on the wheels 3 and is provided with the proper pole or tongue for the attachment of the draft animals. A receptacle, preferably a wooden tank or barrel 4 is mounted on the vehicle frame 2, and is adapted to contain a supply of the solution to be sprayed. The tank 4 is provided with a funnel-shaped opening 5 at the top, so that the fluid can be conveniently poured in.

The necessary pressure to operate the sprays is obtained from the force-pump 6, located on the vehicle frame, and supplied with liquid from the supply tank 4, through the feed pipe 7. The pump 6 is driven from the rear axle 8, which revolves with the rear wheels, by means of the drive chain 9 and the sprocket-wheels 10—11. The sprocket-wheel 11 is preferably mounted on the vehicle frame in line with the pump, so that its motion can readily be transferred to the pump piston 12. A clutch, operated by the lever 14 is provided so that the pump may be readily disconnected from the running gear when it is desirable to transport the apparatus from place to place without operating the sprays. A seat 15 for the driver and operator is provided at the rear of the vehicle in such position that the lever 14 can be easily reached.

From the pump 6, the solution is forced into the pressure tank 16 from whence it passes through the valve 20 into the pipe or hollow mast 17. For the purpose of preventing the pressure in the pressure tank 16 increasing beyond the desired limit and throwing too great a strain on the pump, I employ a by-pass or return-pipe 18, provided with a relief valve 19. When the pressure within the tank 16 rises above the desired point, the relief valve 19 is automatically opened, and the solution returns to the supply tank 4 through the pipe 18. A pressure gage 21 is also provided to allow the operator to observe the pressure in the tank 16.

The hollow mast 17 is made of any desirable height, according to the work to be accomplished, and is held in position by the guy-wires 22 attached to the frame of the vehicle. At intervals apart vertically of the mast 17 are arranged the longitudinally extending hollow arms or pipes 23, carrying the sprayer nozzles 24. The length of the arms 23 is increased toward the upper end of the mast, so that the nozzles on the upper arms are spaced farther apart than those below. I have preferably arranged three nozzles on each of the arms; one at each end and one in the middle to spread the spray over a greater area. The arms 23 are connected to the hollow mast 17 on each side through the spring held valves 25—26 which are held normally closed by an inclosed spring.

The valves 25—26 are operated by the movement of the arms 27—28. The arms are connected to wires or cords 30 and are adapted to be operated by the movement of the levers 29—31 respectively through the medium of the wires 32—33, the bell-cranks 34—35 and the wires 30. The nozzles on one side are therefore controlled by one of the levers 29 and on the other side by the other lever 31 and the driver of the vehicle is enabled to regulate the spraying operation from the driver's seat, and to confine the spray to either side of the roadway according to the varying conditions. The nozzles 24 project the spray at right angles to the direction of travel of the vehicle and are constructed to form a vertically disposed fan-shaped spray.

By varying the length of the longitudinally extending arms 23 and thereby varying the distance between the nozzles at the different heights, a broadside spray is obtained, covering an area equal in one dimension to the distance between the most widely spaced nozzles. This arrangement is more clearly shown in Fig. 3, the distances between the vertical projections of the nozzles being approximately equal.

It is understood that I do not limit myself to the exact means shown for accomplishing the various results as many changes could be made in the apparatus without varying from the spirit of my invention.

I claim:—

1. In a spraying apparatus, the combination of a vehicle, a hollow mast, pairs of spray pipes arranged longitudinally of said vehicle and spaced apart vertically on the mast, the spray pipes of each pair being arranged on opposite sides of the mast, the length of the spray pipes increasing with the distance above the base of the mast, and laterally projecting nozzles at the middle and ends of each of the spray pipes.

2. In a spraying apparatus, the combination of a vehicle, a liquid supply-tank thereon, a pressure tank, means for forcing the liquid into the pressure tank, a vertical pipe connected to the pressure tank, horizontally disposed spray-pipes arranged longitudinally of the vehicle in pairs on opposite sides of the vertical pipe, a valve between each spray pipe and the vertical pipe, laterally projecting horizontal nozzles on each spray pipe and means within reach of the driver of the vehicle for independently regulating the sprays on opposite sides of the vertical pipe.

3. In a spraying apparatus, the combination of a vehicle, a liquid supply tank thereon, a pressure tank, means operated by the running gear for forcing the liquid into the pressure tank, a pipe connecting the pressure tank with the supply tank, a valve in said pipe operated by an excess of pressure in the pressure tank to allow part of the liquid to return to the supply tank, a vertical pipe connected to the pressure tank, spray pipes arranged longitudinally of the vehicle in pairs on opposite sides of the vertical pipe, the length of the spray pipes increasing with the distance from the base of the vertical pipe, laterally projecting nozzles on the spray pipes, valves between the spray pipes and the vertical pipe, and means within reach of the driver of the vehicle for simultaneously operating all of the valves on either side of the vertical pipe.

EOLO BATISTONI.

Witnesses:
  H. G. PROST,
  M. REGNER.

Copies of this patent may be obtained for five cents each, by addressing the "Commissioner of Patents, Washington, D. C."